(12) United States Patent
Cronin et al.

(10) Patent No.: US 6,457,382 B2
(45) Date of Patent: Oct. 1, 2002

(54) METHOD AND APPARATUS FOR SHIFTING RANGES IN A TORQUE REVERSING MECHANICAL TRANSMISSION COUPLED TO A HYDROSTATIC TRANSMISSION

(75) Inventors: Michael G. Cronin, Peoria; Brian D. Kuras, East Peoria, both of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/865,128

(22) Filed: May 24, 2001

Related U.S. Application Data (63) Continuation of application No. 09/466,509, filed on Dec. 17, 1999.

(51) Int. Cl.[7] .............................................. F16H 47/00
(52) U.S. Cl. ...................... 74/733.1; 74/731.1; 477/69; 477/110
(58) Field of Search ........................... 74/733.1, 731.1; 477/41, 50, 69, 110

(56) References Cited

U.S. PATENT DOCUMENTS 5,505,113 A * 4/1996 Wiest ........................ 74/733.1
5,511,368 A * 4/1996 Kocher ........................ 56/15.2
5,560,203 A * 10/1996 Pollman ....................... 60/327
5,823,072 A * 10/1998 Legner ....................... 74/733.1
6,272,950 B1 * 8/2001 Braun et al. ............... 74/731.1

* cited by examiner

Primary Examiner—Sherry Estremsky
Assistant Examiner—Tisha D. Lewis
(74) Attorney, Agent, or Firm—John W. Morrison (57) ABSTRACT

A transmission assembly having a variable displacement hydraulic device which controls a ratio of an input speed to an output speed of the hydrostatic transmission is disclosed. The transmission assembly further includes a torque reversing mechanical transmission coupled to the hydrostatic transmission and having a first range and a second range. The transmission assembly further includes an output shaft driven by one or more of the hydrostatic transmission and the mechanical transmission which causes a work machine to move at a travel speed and a controller. The controller is operable to determine a transmission load and an equal displacement travel speed ratio based on the transmission load. A shift from the first gear range to the second gear range is based on the equal displacement travel speed ratio. A method of operating a transmission assembly is also disclosed.

20 Claims, 7 Drawing Sheets

$$Q_{out,\,p1} = \eta_{vol,\,p1}\,N_{p1}\,D_{p1} = \frac{N_{m1}D_{m1}}{\eta_{vol,\,m1}} = Q_{in,\,m1}$$

Fig-3-

$$Q_{in,\,p2} = \frac{N_{p2}\,D_{p2}}{\eta_{vol,\,p2}} = \eta_{vol,\,m1}\,N_{m2}D_{m2} = Q_{out,\,m2}$$

Fig_6_

Fig_7_

| Step | Speed | Load | Efficiency |
|---|---|---|---|
| 1 | Below A | High Positive | Low |
| 2 | Above C | High Negative | Low |
| 3 | Between A & B | Medium Positive | Medium |
| 4 | Between D & C | Medium Negative | Medium |
| 5 | Between B & D or High Idle | Small Positive | High |

METHOD AND APPARATUS FOR SHIFTING RANGES IN A TORQUE REVERSING MECHANICAL TRANSMISSION COUPLED TO A HYDROSTATIC TRANSMISSION

This application is a continuation of prior utility application Ser. No. 09/466,509 filed on Dec. 17, 1999.

DESCRIPTION

1. Technical Field

The present invention generally relates to a continuously variable transmission, and more specifically to a method and apparatus for shifting ranges in a continuously variable transmission.

2. Background of the Invention

Many work machines, particularly earth working machines, use a continuously variable transmission to drive traction wheels or tracks of the work machine. Typically, a hydrostatic drive, consisting of a hydraulic pump and a hydraulic motor, provides a continuously variable speed output to the wheels or tracks of the work machine. In particular, the speed output can be continuously varied by controlling the displacements of either the hydraulic pump or the hydraulic motor which comprise the hydrostatic drive system.

In order to operate over a wide range of operating conditions, the output of the continuously variable hydrostatic transmission is transmitted through a mechanical transmission. The mechanical transmission has a number of transmission ranges corresponding to different operating speeds of the work machine. The combination of the continuously variable transmission and the mechanical transmission allows a continuously variable transmission to operate over a wider range of speeds than is possible using the continuously variable transmission alone.

One drawback to using a continuously variable transmission with a number of transmission ranges is that power may not be smoothly transmitted through the transmission due to a range shift from a first gear range to a second gear range. Typically, during the range shift, there is a torque reversal in the continuously variable transmission. When the continuously variable transmission is a hydrostatic transmission, the actuators which control the displacement of a variable displacement hydraulic components have the slowest response time. Thus, during a range shift, the displacement remains relatively constant during the torque reversal. The torque reversal and the relatively constant displacement can cause the work machine to be perceived as non-continuous during the range shift and thus, the range shift may feel objectionable if the shift point is not adjusted for load.

However, it is possible to advantageously choose shift points such that reversal of torque is taken into consideration and the displacement of a controlling variable displacement hydraulic device, either the pump or the motor, remains relatively constant during the shift. However, to choose such advantageous shift points, it is necessary to estimate the volumetric efficiency of the components of the hydrostatic transmission in order to determine which shift points result in the same displacement after the shift as before the shift with no discrete change in output speed.

What is needed therefore is a method and apparatus for adjusting the shift point as a function of load when shifting ranges in a continuously variable transmission which overcomes the above-mentioned drawbacks.

DISCLOSURE OF THE INVENTION

In accordance with a first embodiment of the present invention, there is provided a transmission assembly having a hydrostatic transmission with a variable displacement hydraulic device which controls a ratio of an input speed to an output speed of the hydrostatic transmission. The transmission assembly further includes a torque reversing mechanical transmission coupled to the hydrostatic transmission and having a first range and a second range. The transmission assembly yet further includes an output shaft driven by one or more of the hydrostatic transmission and the mechanical transmission which causes a work machine to move at a travel speed and a controller. The controller is operable to determine a transmission load and an equal displacement travel speed ratio based on the load. A shift from the first gear range to the second gear range is based on the equal displacement travel speed ratio.

In accordance with a second embodiment of the present invention, there is provided a method of operating a transmission assembly having a hydrostatic transmission with a variable displacement hydraulic device which controls a ratio of an input speed to an output speed of the hydrostatic transmission, a torque reversing mechanical transmission coupled to the hydrostatic transmission and having a first range and a second range, an output shaft driven by one or more of the hydrostatic transmission and the mechanical transmission at a travel speed, and a controller. The method includes the steps of determining a transmission load and determining a displacement of the variable displacement hydraulic device which reduces the change in travel speed ratio caused by the shift from the first gear range to the second gear range. The method further includes the step of initiating a shift from the first range to the second range at a based on the determined displacement.

BEST MODE FOR CARRYING OUT THE INVENTION

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 1:
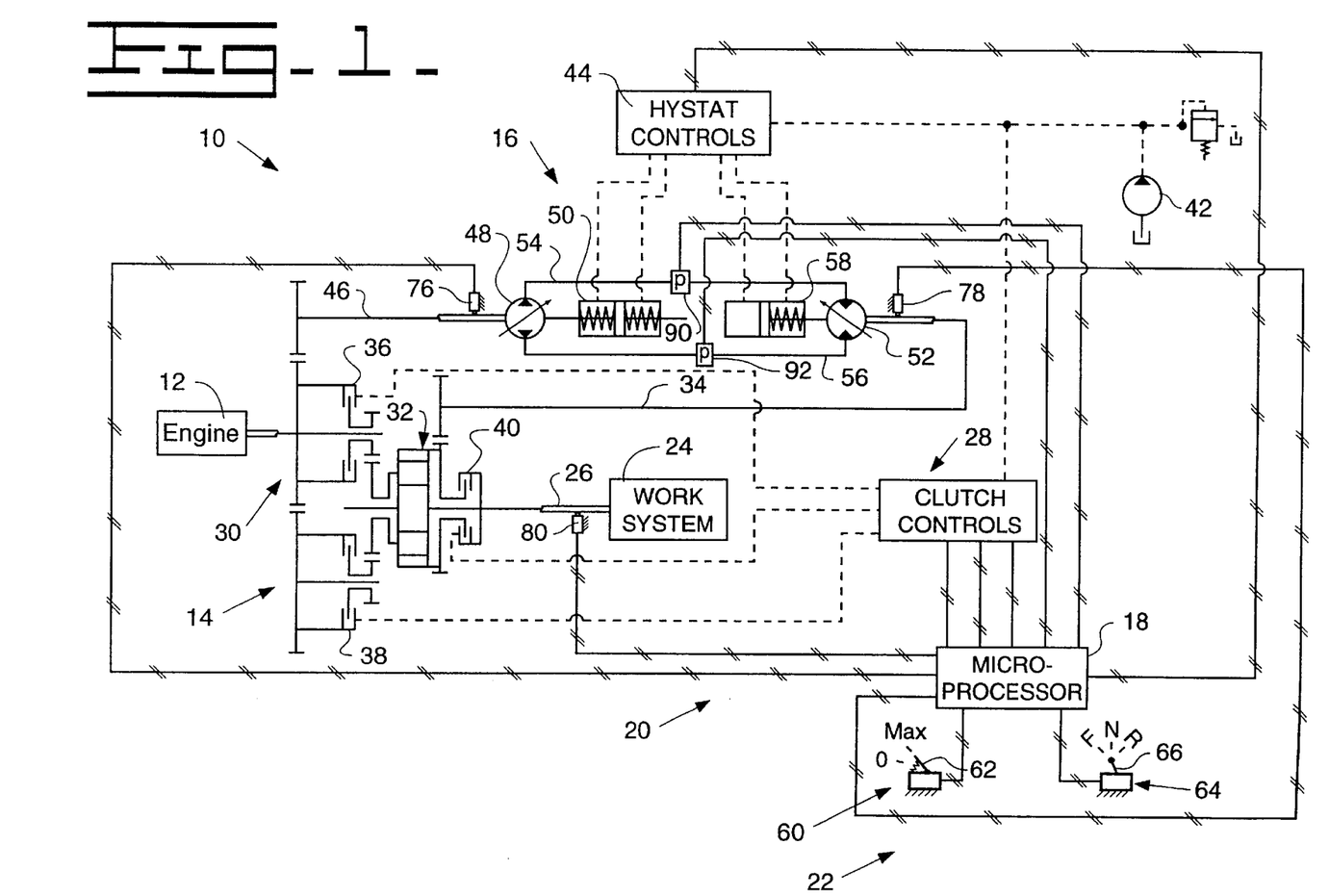
FIG. 1 is a schematic view of a hydro-mechanical, continuously variable transmission which incorporates the features of the present invention therein.

Referring now to FIG. 1, there is shown a transmission assembly 10 that incorporates the features of the present invention therein. The transmission assembly 10 is adapted for use in a work machine, such as a loader (not shown), having an engine 12. The transmission assembly 10 is of the continuously variable type and includes a mechanical transmission 14, a continuously variable hydrostatic transmission 16, a micro-processor based controller 18, a sensing arrangement 20 and a command input arrangement 22. A work system 24 is connected to the transmission assembly 10 by a drive shaft 26. The work system 24 is typically the drive wheels or tracks of the work machine.

The mechanical transmission 14 and an associated clutch control arrangement 28 are operatively connected to the engine 12 through a gear arrangement 30. The mechanical transmission 14 includes a summing planetary arrangement 32 operatively connected to both the engine 12 through the gear arrangement 30 and to the hydrostatic transmission 16 through a motor output shaft 34. The output of the summing planetary arrangement 32 is connected to the drive shaft 26. The mechanical transmission 14 further includes directional high speed clutches 36, 38 and a low speed clutch 40. The clutch control arrangement 28 is connected to a source of pressurized pilot fluid, such as a pilot pump 42. The controller 18 is operative to control engagement and disengagement of the respective clutches 36, 38 and 40 in response to electrical signals from the controller 18 to the clutch controller 28.

The hydrostatic transmission 16 and a displacement, controller 44 are operatively connected to the engine 12 through a pump input drive shaft 46. The hydrostatic transmission 16 includes a variable displacement pump 48, a pump displacement actuator 50, a variable displacement motor 52 fluidly connected to the variable displacement pump 48 by conduits 54, 56, and a motor displacement actuator 58. The displacement controller 44 is connected to the pilot pump 42 and the controller 18. The displacement controller 44 controls movement of the respective pump and motor displacements actuators 50, 58 in response to control signals from the controller 18, thus controlling the transmission ratio of the continuously variable transmission 16.

The command input arrangement 22 includes a speed input mechanism 60 having a first input device or speed pedal 62 moveable from a zero speed position to a maximum speed position for transmitting a desired velocity signal to the controller 18. The command input arrangement further includes a second input device or directional control 64 for transmitting a directional control signal to the controller 18 in response to the position of a lever 66. The controller 18 includes RAM and ROM (not shown) that stores transmission control software, synchronous travel speed ratios, and volumetric efficiency data used to determine an equal displacement travel speed ratio (described below).

The sensing arrangement 20 includes a transmission input speed sensor 76 operative to sense the speed of the pump input shaft 46 and direct a transmission input speed signal representative of the transmission input speed or engine speed to the controller 18. A motor speed sensor 78 is operative to sense the speed of the motor output shaft 34 and direct a motor speed signal representative of the motor output speed to the controller 18. The motor speed signal combined with the transmission input speed signal can also be used to determine a transmission output speed and a machine travel speed if the engagement state of the clutches 36, 38, and 40 are known. A transmission output speed sensor 80 is operative to sense the transmission output speed and direct a transmission output speed signal to the controller 18. Either of the motor speed sensor 78 combined with the input speed sensor 76 or the transmission output speed sensor 80 can be used to calculate the transmission output speed or the machine travel speed. However, in the present invention, the motor speed sensor 78 is used to precisely control the displacement of the pump 48 and the motor 52 and therefore has a much higher resolution and lower dropout than the transmission output speed sensor 80. Thus, it is preferable to use the motor speed sensor 78 and the engagement state of the clutches 36, 38, and 40 to determine the transmission output speed and the machine travel speed. However, it is still possible and practical to use the output speed sensor 80 to determine machine travel speed.

The controller 18 is further operable to calculate a motor speed ratio from the transmission input speed signal generated by the sensor 76 and the motor speed signal generated by the sensor 78. In particular, the motor speed ratio is the ratio of speed of the shaft 34 to the speed of the shaft 46. The controller 18 is still further operable to calculate a travel speed ratio from the transmission input speed signal generated by the sensor 76 and the transmission output speed signal generated by the sensor 80. In particular, the travel speed ratio is the ratio of speed of the shaft 26 to the speed of the shaft 46.

The sensing arrangement 20 further includes a first pressure sensor 90 which senses the pressure in the line or conduit 54 and directs a first pressure signal to the controller 18 and a second pressure sensor 92 which senses the pressure in the line or conduit 56 and directs a second pressure signal to the controller 18. The first pressure signal and the second pressure signal are used to calculate the volumetric efficiency of various components within the hydrostatic transmission 16.

Figure 2:
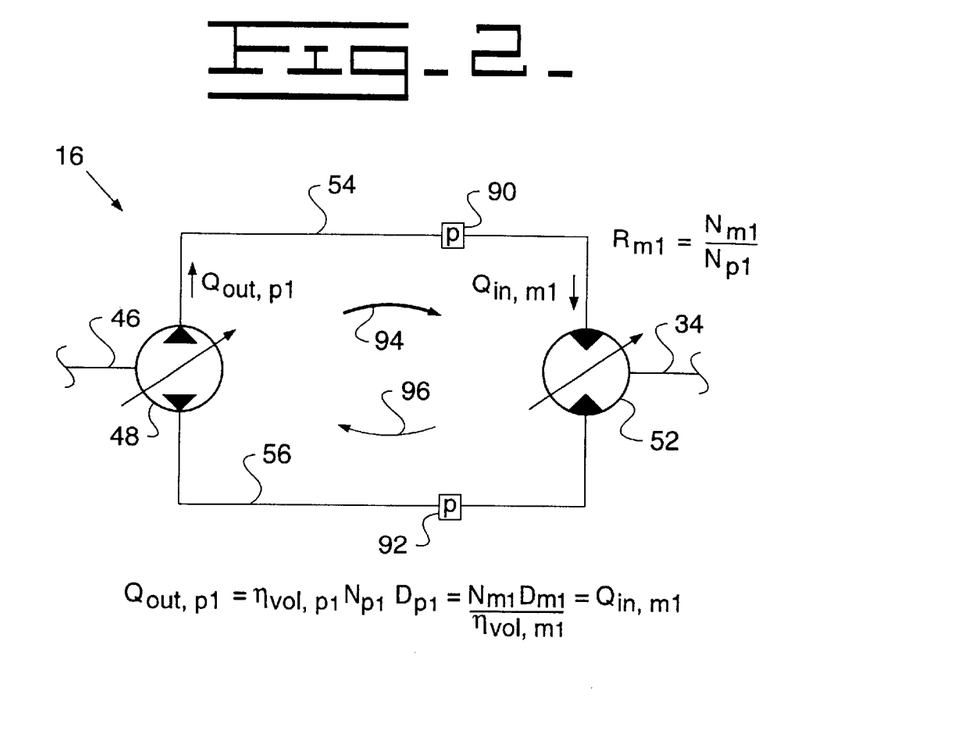
FIG. 2 is enlarged view of the hydrostatic transmission shown in FIG. 1, showing the pump driving the motor.

Referring now to FIG. 2, there is shown an enlarged schematic of the hydrostatic transmission 16 operating under conditions where the variable displacement pump 48 is driving the variable displacement motor 52. In particular, the fluid flow produced by the variable displacement pump 48, indicated by arrow 94, is at higher pressure than the return fluid flow, indicated by arrow 96. Thus, torque is transmitted from the shaft 46 to the shaft 34 via the hydrostatic transmission 16. Under this first operating condition, the flow exiting the pump, $Q_{out,p1}$, is equal to the flow entering the motor, $Q_{in,m1}$:

$$Q_{out,p1} = \eta_{vol,p1} N_{p1} D_{p1} = Q_{in,m1} = \frac{N_{m1} D_{m1}}{\eta_{vol,m1}}$$

where $\eta_{vol,p1}$ is the volumetric efficiency of the variable displacement pump 48, $N_{p1}$ is the speed of the variable displacement pump 48, $D_{p1}$ is the displacement of the variable displacement pump 48, $\eta_{vol,m1}$ is the volumetric efficiency of the variable displacement motor 52, $N_{m1}$ is the speed of the variable displacement motor 52, and $D_{m1}$ is the displacement of the variable displacement motor 52 when operating at the first operating condition. Therefore, the displacement $D_{p1}$ of the variable displacement pump 48 operating at the first operating condition can be expressed as:

$$D_{p1} = \frac{D_{m1}}{\eta_{vol,m1}\eta_{vol,p1}}\left(\frac{N_{m1}}{N_{p1}}\right) = \frac{D_{m1}}{\eta_{vol,m1}\eta_{vol,p1}} \cdot R_{m1}$$

where $R_{m1}$ is the motor speed ratio at the first operating condition. The displacement $D_{m1}$ of the variable displacement motor 52 can be expressed as:

$$D_{m1} = \eta_{vol,m1}\eta_{vol,p1}D_{p1}\left(\frac{N_{p1}}{N_{m1}}\right) = \eta_{vol,m1}\eta_{vol,p1}D_{p1}\left(\frac{1}{R_{m1}}\right)$$

Figure 3:
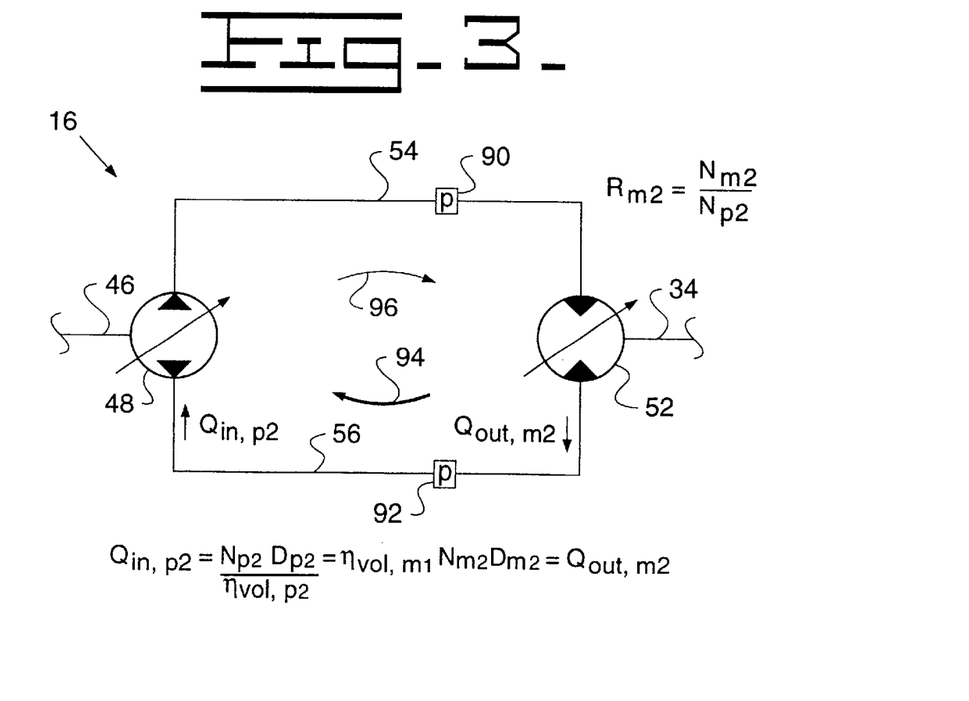
FIG. 3 is view similar to FIG. 2, but showing the motor driving the pump.

Referring now to FIG. 3, there is shown an enlarged schematic of the hydrostatic transmission 16 operating at a second operating condition where the variable displacement motor 52 is driving the variable displacement pump 48. In particular, the fluid flow produced by the variable displacement motor 52, indicated by arrow 94, is at higher pressure than the return fluid flow, indicated by arrow 96. Under the second operating condition, the variable displacement pump 48 is functioning as a motor driven by the variable displacement motor 52 which is functioning as a pump. Torque is transmitted from the shaft 34 to the shaft 46 via the hydrostatic transmission 16. Note, that this is a "torque reversal" from the first operating condition shown in FIG. 2. Also note, that the direction of the flow through the hydrostatic transmission 16 does not reverse, but the direction which torque is transferred between the shaft 46 and the shaft 34 is reversed. Under the second operating condition, the flow entering the pump, $Q_{in,p2}$, is equal to the flow exiting the motor, $Q_{out,m2}$:

$$Q_{in,p2} = \frac{N_{p2}D_{p2}}{\eta_{vol,p2}} = Q_{out,m2} = \eta_{vol,m2}N_{m2}D_{m2}$$

where $\eta_{vol,p2}$ is the volumetric efficiency of the variable displacement pump 48, $N_{p2}$ is the speed of the variable displacement pump 48, $D_{p2}$ is the displacement of the variable displacement pump 48, $\eta_{vol,m2}$ is the volumetric efficiency of the variable displacement motor 52, $N_{m2}$ is the speed of the variable displacement motor 52, and $D_{m2}$ is the displacement of the variable displacement motor 52 when operating at the second operating condition. Under the second operating condition, the displacement $D_{p2}$ of the pump 48 can be expressed as:

$$D_{p2} = \eta_{vol,p2}\eta_{vol,m2}D_{m2}\left(\frac{N_{m2}}{N_{p2}}\right) = \eta_{vol,p2}\eta_{vol,m2}D_{m2} \cdot R_{m2}$$

where $R_{m2}$ is the motor speed ratio at the second operating condition and the displacement $D_{m2}$ of the variable displacement motor 52 can be expressed as:

$$D_{m2} = \frac{D_{p2}}{\eta_{vol,p2}\eta_{vo,m2}}\left(\frac{N_{p2}}{N_{m2}}\right) = \frac{D_{p2}}{\eta_{vol,p2}\eta_{vol,m2}} \cdot \left(\frac{1}{R_{m2}}\right)$$

Referring now to FIGS. 4–7, there are shown characteristic plots of the motor speed ratio of the transmission 10 for a given travel speed ratio. The motor speed ratio is the ratio of the speed of the shaft 34 to the speed of the shaft 46. The travel speed ratio is the ratio of the speed of the shaft 26 to the speed of the shaft 46. A line 101 is the transmission operating line when the transmission 10 is in a first gear range when the clutch 40 is engaged. As motor speed ratio is increased in the first gear range 101, travel speed ratio is also increased. A line 102 is the transmission operating in a second gear range when the clutch 36 is engaged. As motor speed ratio is decreased in the second gear range 102, travel speed ratio is further increased. A synchronous travel speed ratio 100 is the travel speed ratio which produces the same motor speed ratio in both the first gear range 101 and the second gear range 102.

Figure 4:
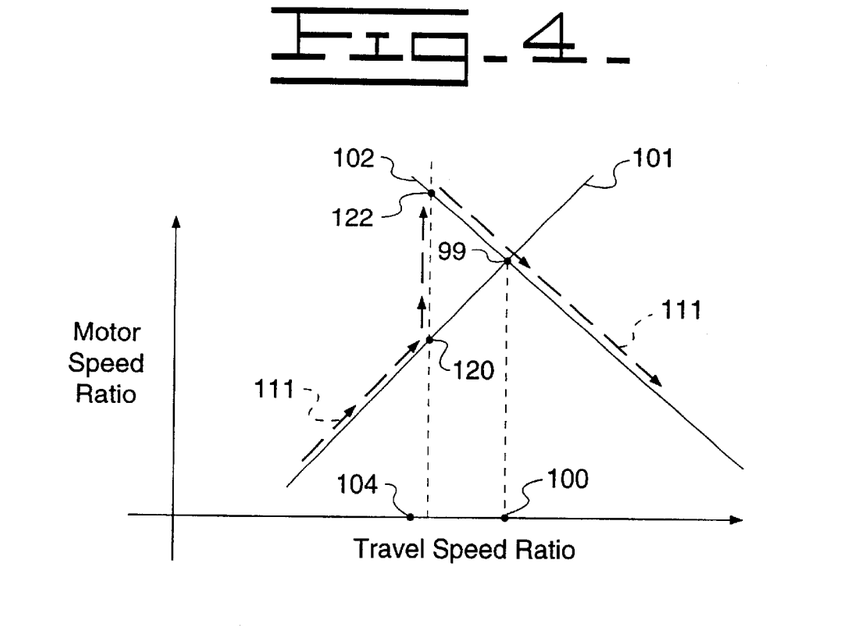
FIG. 4 is a graph which illustrates motor speed ratio versus travel speed ratio during a shift from a first gear range to a second gear range while operating under a positive load.

Referring now to FIG. 4, there is shown a path 111 where the work machine is accelerating toward the synchronous travel speed ratio 100 in the first gear range 101 under a positive load. Positive load on the engine 12 when operating in the first gear range 101 is indicated by torque being transferred from the shaft 46 to the shaft 34 via the hydrostatic transmission 16. Under a positive load conditions near the synchronous travel speed ratio 100, the work machine can be accelerated in the first gear range either by increasing the displacement of the variable displacement pump 48 or by decreasing the displacement of the variable displacement motor 52. Under a positive load condition, during a range shift from the line 101 to the line 102 a torque reversal occurs (i.e. before the range shift torque is transmitted from the shaft 46 to the shaft 34 and after the range shift torque is transmitted from the shaft 34 to the shaft 46). This torque reversal occurs much faster than the physical ability to change the displacement of the controlling hydraulic device. Preferably, the displacement of the controlling hydraulic unit, i.e. the variable displacement pump 48 or the variable displacement motor 52, would remain constant before and after the shift from the first gear range 101 to the second gear range 102, while retaining the exact same travel speed ratio before the shift as after the shift.

Operation in the first gear range 101 under a positive load condition corresponds to the first load condition shown in FIG. 2, whereas operation in the second gear range 102 under a positive load condition corresponds to the second load condition shown in FIG. 3. When the variable displacement pump 48 is the controlling hydraulic device, then it is desirable to have the displacement of the pump 48 prior to the shift, which corresponds to $D_{p1}$, to be equal to the displacement of the pump 48 after the shift, which corresponds to $D_{p2}$. The displacements are set equal to one another before and after the shift because the torque reversal occurs much faster than the physical ability to change the displacement. Setting $D_{p1}$ equal to $D_{p2}$ results in the following equation:

$$D_{p1} = \frac{D_{m1}}{\eta_{vol,m1}\eta_{vol,p1}} \cdot R_{m1} = D_{p2} = \eta_{vol,p2}\eta_{vol,m2} \cdot D_{m2}R_{m2}$$

Since only one variable displacement hydraulic device is varied at one time, the displacement $D_{m1}$ of the motor 52 before the shift is equal to the displacement $D_{m2}$ of the motor 52 after the shift. Solving for the relationship between motor speed ratio $R_{m1}$ prior to the shift and motor speed ratio $R_{m2}$ after the shift results in the following equation:

$$R_{m1} = \eta_{vol,m1}\eta_{vol,p1}\eta_{vol,m2}\eta_{vol,p2}R_{m2}$$

Since all of the volumetric efficiencies $\eta_{vol,m1}$, $\eta_{vol,p1}$, $\eta_{vol,m2}$, and $\eta_{vol,p2}$ must be less than unity, then the motor speed ratio $R_{m2}$ of the motor 52 after the shift, must be greater than the motor speed ratio $R_{m1}$ of the motor 52 before the shift to maintain a constant travel speed ratio before and after the shift.

Alternately, when the variable displacement motor 52 is used as the controlling hydraulic device, then it is desirable to have the displacement of the motor 52 prior to the shift, which corresponds to $Dm_1$, to be equal to the displacement of the motor 52 after the shift, which corresponds to $Dm_2$. The displacements are set equal to one another before and after the shift because the torque reversal occurs much faster than physical ability to change the displacement. Setting $Dm_1$ equal to $Dm_2$ results in the following equation:

$$D_{m1} = \eta_{vol,m1}\eta_{vol,p1}D_{p1}\left(\frac{1}{R_{m1}}\right) = D_{m2} = \frac{D_{p2}}{\eta_{vol,p2}\eta_{vol,m2}}\cdot\left(\frac{1}{R_{m2}}\right)$$

Since only one variable displacement hydraulic device is varied at one time, the displacement $Dp_1$ of the pump 48 before the shift is equal to the displacement $Dp_2$ of the pump 48 after the shift. Solving for the relationship between motor speed ratio $R_{m1}$ prior to the shift and motor speed ratio $R_{m2}$ after the shift results in the following equation:

$$R_{m1} = \eta_{vol,m1}\eta_{vol,p1}\eta_{vol,m2}\eta_{vol,p2}R_{m2}$$

It should be appreciated that the relationship between the motor speed ratio $R_{m1}$ prior to the shift and the motor speed ratio $R_{m2}$ after the shift is the same when using either the variable displacement pump 48 or the variable displacement motor 52 as the controlling hydraulic device.

The controller 18 must determine an equal displacement travel speed ratio 104 which is the travel speed ratio where the motor speed ratio $R_{m1}$ at a shift initiation point 120 in the first range 101 is equal to $\eta_{vol,m1}\eta_{vol,p1}\eta_{vol,m2}\eta_{vol,p2}$ multiplied by the motor speed ratio $R_{m2}$ at the shift completion point 122 in the second gear range 102. When accelerating in the first gear range 100 under a positive load, the controller 18 directs a shift command to cause a shift from the first gear range 101 to the second gear range 102 when the work machine reaches the shift initiation point 120 in the first gear range 101 which corresponds to the equal displacement travel speed ratio 104. What is meant herein as a "shift initiation point" is the last point where full torque is being transferred via an off going clutch and an oncoming clutch is fully filled with fluid. Subsequent to the "shift initiation point" the pressure supplied to the oncoming clutch is rapidly ramped up to transfer torque via the oncoming clutch. The shift is completed at the shift completion point 122 in the second gear range 102 which also corresponds to the equal displacement travel speed ratio 104. What is meant herein as the "shift completion point" is the point at which pressure supplied to the oncoming clutch causes the oncoming clutch to become fully engaged.

Figure 5:
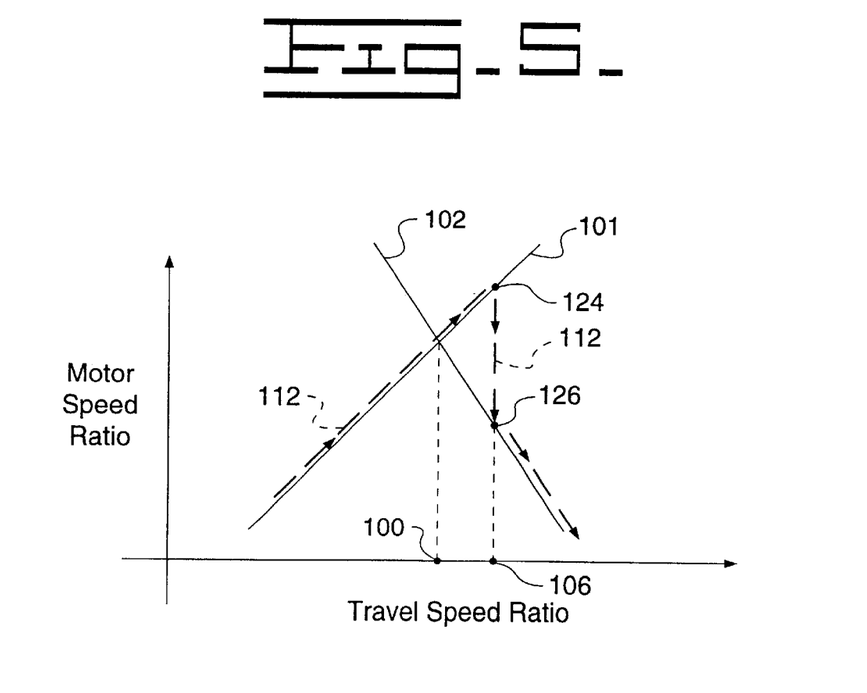
FIG. 5 is a graph similar to FIG. 4, but showing a shift from a first gear range to a second gear range while operating under a negative load.

Referring now to FIG. 5, there is shown a path 112 where the work machine is accelerating toward the synchronous travel speed ratio 100 in the first gear range 101 under a negative load. Negative load on the engine 12 when operating in the first gear range 101 is indicated by torque being transferred from the shaft 34 to the shaft 46 via the hydrostatic transmission 16. Under a negative load conditions near the synchronous travel speed ratio 100, the work machine can be accelerated either by increasing the displacement of the variable displacement pump 48 or by decreasing the displacement of the variable displacement motor 52. Under a negative load condition, during a range shift from the line 101 to the line 102 a torque reversal occurs (i.e. before the range shift torque is transmitted from the shaft 34 to the shaft 46 and after the range shift torque is transmitted from the shaft 46 to the shaft 34). This torque reversal occurs much faster than the physical ability to change the displacement of the controlling hydraulic device. Preferably, the displacement of the controlling hydraulic unit, i.e. the variable displacement pump 48 or the variable displacement motor 52, would remain constant before and after the shift from the first gear range 101 to the second gear range 102, while retaining the exact same travel speed ratio before the shift as after the shift.

Operation in the first gear range 101 under a negative load condition corresponds to the second load condition shown in FIG. 3, whereas operation in the second gear range 102 under a negative load condition corresponds to the second load condition shown in FIG. 2. When the variable displacement pump 48 is the controlling hydraulic device, then it is desirable to have the displacement of the pump 48 prior to the shift, which corresponds to $D_{p2}$, to be equal to the displacement of the pump 48 after the shift, which corresponds to $D_{p1}$. The displacements are set equal to one another before and after the shift because the torque reversal occurs much faster than physical ability to change the displacement. Setting $D_{p2}$ equal to $D_{p1}$ results in the following equation:

$$D_{p2} = \eta_{vol,p2}\eta_{vol,m2}\cdot D_{m2}R_{m2} = D_{p1} = \frac{D_{m1}}{\eta_{vol,m1}\eta_{vol,p1}}\cdot R_{m1}$$

Since only one variable displacement hydraulic device is varied at a time, the displacement $D_{m2}$ of the motor 52 before the shift is equal to the displacement $D_{m1}$ of the motor 52 after the shift. Solving for the relationship between motor speed ratio $R_{m2}$ prior to the shift and motor speed ratio $R_{m1}$ after the shift results in the following equation:

$$R_{m2} = \frac{1}{\eta_{vol,m1}\eta_{vol,p1}\eta_{vol,m2}\eta_{vol,p2}}R_{m1}$$

Since all of the volumetric efficiencies $\eta_{vol,m1}$, $\eta_{vol,p1}$, $\eta_{vol,m2}$, and $\eta_{vol,p2}$ must be less than unity, then the motor speed ratio $R_{m1}$ of the motor 52 after the shift, must be less than the motor speed ratio $R_{m2}$ of the motor 52 before the shift to maintain a constant travel speed ratio before and after the shift. It should be appreciated that the relationship between the motor speed ratio $R_{m2}$ prior to the shift and the motor speed ratio $R_{m1}$ after the shift is the same if the variable displacement motor 52 is used as the controlling hydraulic device.

The controller 18 must determine an equal displacement travel speed ratio 106 which is the travel speed ratio where the motor speed ratio $R_{m2}$ at a shift initiation point 124 in the first range 101 is equal to the motor speed ratio $R_{m1}$ at the shift completion point 126 in the second gear range 102 divided by $\eta_{vol,m1}\eta_{vol,p1}\eta_{vol,m2}\eta_{vol,p2}$. When accelerating in the first gear range 101 under a negative load, the controller 18 directs a shift command to cause a shift from the first gear range 101 to the second gear range 102 when the work machine reaches the shift initiation point 124 in the first gear range 101 which corresponds to the equal displacement travel speed ratio 106. The shift is completed at the shift completion point 126 in the second gear range 102 which also corresponds to the equal displacement travel speed ratio 106.

Figure 6:
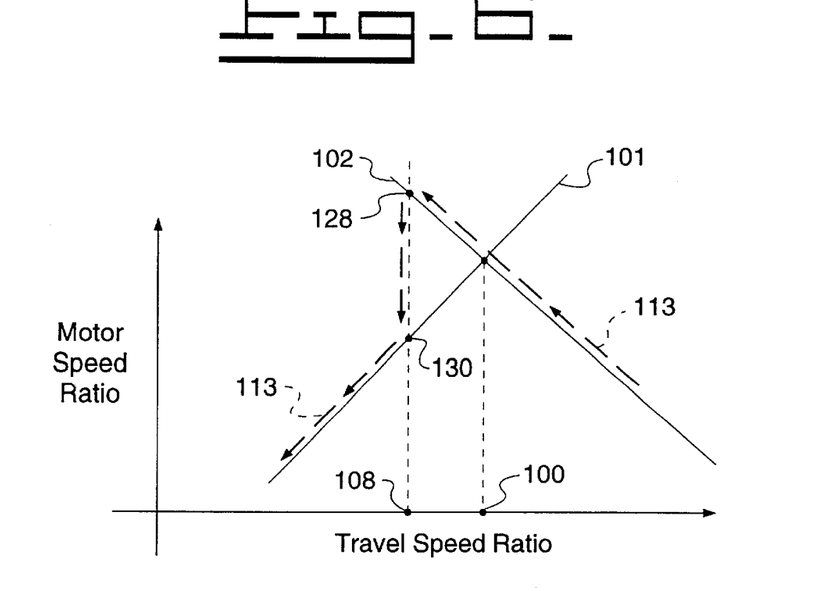
FIG. 6 is a graph similar to FIG. 4, but showing a shift from a second gear range to a first gear range while operating under a positive load.

Referring now to FIG. 6, there is shown a path 113 where the. work machine is decelerating toward the synchronous travel speed ratio 100 in the second gear range 102 under a positive load. The positive load on the engine 12 when operating in the second gear range 102 is indicated by torque being transferred from the shaft 34 to the shaft 46 via the hydrostatic transmission 16. Under a positive load conditions near the synchronous travel speed ratio 100, the work machine can be decelerated in the second gear range 102 either by increasing the displacement of the variable displacement pump 48 or by decreasing the displacement of the variable displacement motor 52. Under a positive load condition, during a range shift from the line 102 to the line 101 a torque reversal occurs (i.e. before the range shift torque is transmitted from the shaft 34 to the shaft 46 and after the range shift torque is transmitted from the shaft 46 to the shaft 34). This torque reversal occurs much faster than the physical ability to change the displacement of the controlling hydraulic device. Preferably, the displacement of the controlling hydraulic unit, i.e. the variable displacement pump 48 or the variable displacement motor 52, would remain constant before and after the shift from the second gear range 102 to the first gear range 101, while retaining the exact same travel speed ratio before the shift as after the shift.

Operation in the second gear range 102 under a positive load condition corresponds to the second load condition shown in FIG. 3, whereas operation in the first gear range 101 under a positive load condition corresponds to the first load condition shown in FIG. 2. When the variable displacement pump 48 is the controlling hydraulic device, then it is desirable to have the displacement of the pump 48 prior to the shift, which corresponds to $D_{p2}$, to be equal to the displacement of the pump 48 after the shift, which corresponds to $D_{p1}$. The displacements are set equal to one another before and after the shift because the torque reversal occurs much faster than physical ability to change the displacement. Setting $D_{p2}$ equal to $D_{p1}$ results in the following equation:

$$D_{p2} = \eta_{vol,p2}\eta_{vol,m2} \cdot D_{m2}R_{m2} = D_{p1} = \frac{D_{m1}}{\eta_{vol,m1}\eta_{vol,p1}} \cdot R_{m1}$$

Since only one variable displacement hydraulic device is varied at a time, the displacement $D_{m2}$ of the motor 52 before the shift is equal to the displacement $D_{m1}$ of the motor 52 after the shift. Solving for the relationship between motor speed ratio $R_{m2}$ prior to the shift and motor speed ratio $R_{m1}$ after the shift:

$$R_{m2} = \frac{1}{\eta_{vol,m1}\eta_{vol,p1}\eta_{vol,m2}\eta_{vol,p2}} R_{m1}$$

Since all of the volumetric efficiencies $\eta_{vol,m1}$, $\eta_{vol,p1}$, $\eta_{vol,m2}$, and $\eta_{vol,p2}$ must be less than unity, then the motor speed ratio $R_{m1}$ of the motor 52 after the shift, must be less than the motor speed ratio $R_{m2}$ of the motor 52 before the shift to maintain a constant travel speed ratio before and after the shift. It should be appreciated that the relationship between the motor speed ratio $R_{m2}$ prior to the shift and the motor speed ratio $R_{m1}$ after the shift is the same if the variable displacement motor 52 is used as the controlling hydraulic device.

The controller 18 must determine an equal displacement travel speed ratio 108 which is the travel speed ratio where the motor speed ratio $R_{m2}$ at a shift initiation point 128 in the second range 102 is equal to the motor speed ratio $R_{m1}$ at the shift completion point 130 in the first gear range 101 divided by $\eta_{vol,m1}\eta_{vol,p1}\eta_{vol,m2}\eta_{vol,p2}$. When decelerating in the second gear range 102 under a positive load, the controller 18 directs a shift command which causes a shift from the second gear range 102 to the first gear range 101 when the work machine reaches the shift initiation point 128 in the second gear range 101 corresponding to the equal displacement travel speed ratio 108. The shift is completed at the shift completion point 130 in the first gear range 101 also corresponding to the equal displacement travel speed ratio 108.

Figure 7:
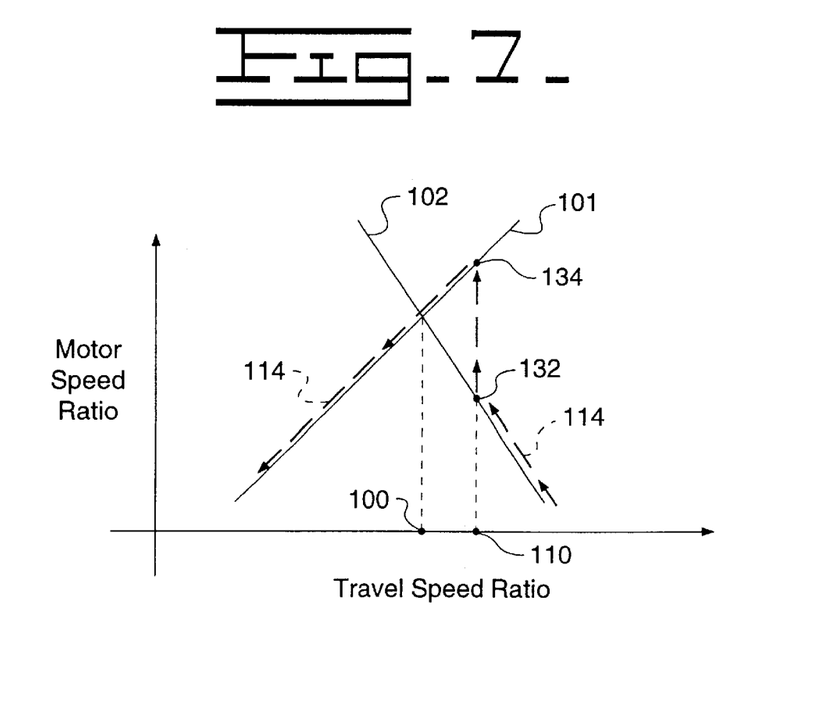
FIG. 7 is a graph similar to FIG. 4, but showing a shift from a second gear range to a first gear range while operating under a negative load.

Referring now to FIG. 7, there is shown a path 114 where the work machine is decelerating toward the synchronous travel speed ratio 100 in the second gear range 102 under a negative load. The negative load condition on the engine 12 when operating in the second gear range 102 is indicated by torque being transferred from the shaft 46 to the shaft 34 via the hydrostatic transmission 16. Under a negative load condition near the synchronous travel speed ratio, the work machine can be decelerated either by increasing the displacement of the variable displacement pump 48 or by decreasing the displacement of the variable displacement motor 52. Under a negative load condition, during a range shift from the line 102 to the line 101 a torque reversal occurs (i.e. before the range shift torque is transmitted from the shaft 46 to the shaft 34 and after the range shift torque is transmitted from the shaft 34 to the shaft 46). This torque reversal occurs much faster than the physical ability to change the displacement of the controlling hydraulic device. Preferably, the displacement of the controlling hydraulic unit, i.e. the variable displacement pump 48 or the variable displacement motor 52, would remain constant before and after the shift from the second gear range 102 to the first gear range 101, while retaining the exact same travel speed ratio before the shift as after the shift.

Operation in the second gear range 102 under a negative load condition corresponds to the first load condition shown in FIG. 2, whereas operation in the first gear range 101 under a negative load condition corresponds to the second load condition shown in FIG. 3. When the variable displacement pump 48 is the controlling hydraulic device, then it is desirable to have the displacement of the pump 48 prior to the shift, which corresponds to $D_{p1}$, to be equal to the displacement of the pump 48 after the shift, which corresponds to $D_{p2}$. The displacements are set equal to one another before and after the shift because the torque reversal occurs much faster than physical ability to change the displacement. Setting $D_{p1}$ equal to $D_{p2}$ results in the following equation:

$$D_{p2} = \eta_{vol,p2}\eta_{vol,m2} \cdot D_{m2}R_{m2} = D_{p1} = \frac{D_{m1}}{\eta_{vol,m1}\eta_{vol,p1}} \cdot R_{m1}$$

Because only one variable displacement hydraulic device is varied at one time, the displacement $D_{m1}$ of the motor 52 before the shift is equal to the displacement $D_{m2}$ of the motor 52 after the shift. Solving for the relationship between motor speed ratio $R_{m1}$ prior to the shift and motor speed ratio $R_{m2}$ after the shift results in the following equation:

$$R_{m1} = \eta_{vol,m1}\eta_{vol,p1}\eta_{vol,m2}\eta_{vol,p2} R_{m2}$$

Since all of the volumetric efficiencies $\eta_{vol,m1}$, $\eta_{vol,p1}$, $\eta_{vol,m2}$, and $\eta_{vol,p2}$ must be less than unity, then the motor speed ratio $R_{m2}$ of the motor 52 after the shift, must be greater than the motor speed ratio $R_{m1}$ of the motor 52 before the shift to maintain a constant travel speed ratio before and after the shift. It should be appreciated that the relationship between the motor speed ratio $R_{m1}$ prior to the shift and the motor speed ratio $R_{m2}$ after the shift is the same using either the variable displacement pump 48 or the variable displacement motor 52 as the controlling hydraulic device.

The controller 18 must determine an equal displacement travel speed ratio 110 which is the is travel speed ratio where the motor speed ratio $R_{m1}$ at a shift initiation point 132 in the second range 102 is equal to $\eta_{vol,m1}\eta_{vol,p1}\eta_{vol,m2}\eta_{vol,p2}$ multiplied by the motor speed ratio $R_{m2}$ at the shift completion point 134 in the first gear range 101. When decelerating in the second gear range 102 under a negative load, the controller 18 directs a shift command which causes a shift from the second gear range 102 to the first gear range 101 when the work machine reaches the shift initiation point 132 in the second gear range 102 corresponding to the equal displacement travel speed ratio 110. The shift is completed at the shift completion point 134 in the first gear range 101 also corresponding to the equal displacement travel speed ratio 110.

Figure 8:
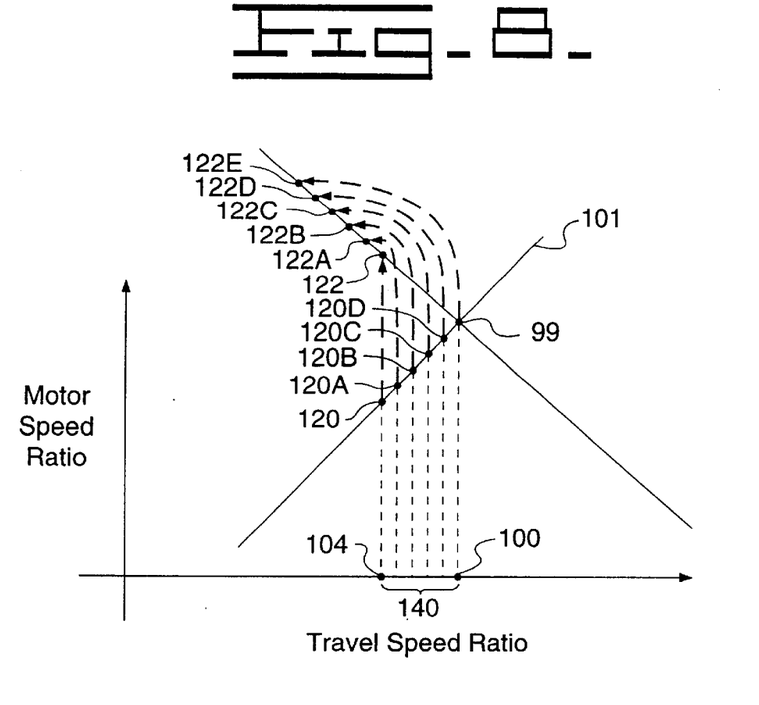
FIG. 8 is a graph which illustrates the relative advantage of shifting near an equal displacement travel speed ratio.

Referring now to FIG. 8, there is shown several shifts under positive load from the first gear range 101 to the second gear range 102, similar to FIG. 4. As shown above, the motor speed ratio $R_{m2}$ after the shift is multiplied by $\eta_{vol,m1}\eta_{vol,p1}\eta_{vol,m2}\eta_{vol,p2}$ to determine the motor speed ratio $R_{m1}$ prior to the shift. Note, that shifting at the equal displacement travel speed ratio 104 at a shift initiation point 120 results in a shift which is completed at the shift completion point 122, which is also at the equal displacement travel speed ratio 104. Thus, shifting at the equal displacement travel speed ratio results in no loss of travel speed ratio during the shift. Shifting at a travel speed ratio greater than the equal displacement travel speed ratio will result in a drop in travel speed ratio during the shift from the first gear range 101 to the second gear range 102 under a positive load. Many prior art transmissions have a shift initiation point near the synchronous travel speed ratio 100, which results in the shift from the line 101 to the line 102 being completed at the point 122E, which corresponds to an undesirable large drop in travel speed ratio, thus giving the feel of the shift being noncontinuous. A travel speed ratio differential 140 is the difference between the synchronous travel speed ratio 100 and the equal displacement travel speed ratio 104. If the shift is initiated at a point 120D, which corresponds to initiating a shift from the line 101 to the line 102 at eighty percent of the travel speed ratio differential 140 after the equal displacement travel speed ratio 104, the shift will be complete at the point 122D on the second gear range 102. The drop in travel speed ratio between the point 120D and 122D will be less than the drop in travel speed ratio caused by initiating the shift from the line 101 to the line 102 at the synchronous travel speed ratio 100. Thus, shifting at the point 120D is more desirable than initiating the shift at the synchronous travel speed ratio 100.

Similarly, if the shift from the line 101 to the line 102 is initiated at a point 120C, which corresponds to initiating the shift at sixty percent of the travel speed ratio differential 140 after the equal displacement travel speed ratio 104, the shift will be complete at the point 122C on the second gear range 102. The drop in travel speed ratio between the point 120C and 122C will be less than the drop caused by initiating the shift at the point 120D. Thus shifting at the point 120C is more desirable than initiating the shift at the point 120D.

Moreover, if the shift from the line 101 to the line 102 is initiated at a point 120B, which corresponds to initiating the shift at forty percent of the travel speed ratio differential 140 after the equal displacement travel speed ratio 104, the shift will be complete at the point 122B on the second gear range 102. The drop in travel speed ratio between the point 120B and 122B will be less than the drop caused by initiating the shift at the point 120C. Thus shifting at the point 120B more desirable than initiating the shift at the point 120C.

Similarly, if the shift from the line 101 to the line 102 is initiated at a point 120A, which corresponds to initiating the shift at twenty percent of the travel speed ratio differential 140 after the equal displacement travel speed ratio 104, the shift will be complete at the point 122A on the second gear range 102. The drop in travel speed ratio between the point 120A and 122A will be less than the drop caused by initiating the shift at the point 120B. Thus shifting at the point 102A is more desirable than initiating the shift at the point 120B.

It should be appreciated that initiating the shift at the point 120 corresponding to the equal displacement travel speed ratio 104 produces no drop in travel speed ratio and is most advantageous. It should further be appreciated that when operating under other operating conditions, shifting at the respective equal displacement travel speed ratios 106, 108, and 110 results in the least change in travel speed ratio and is more advantageous than shifting at any travel speed ratio closer to the synchronous travel speed ratio than the respective equal displacement travel speed ratios 106, 108, and 110. In addition, it should be appreciated that shifting prior to the equal displacement travel speed ratio 104 results in a similar noncontinuous shift as shifting after the equal displacement travel speed ratio 104.

Figure 9:
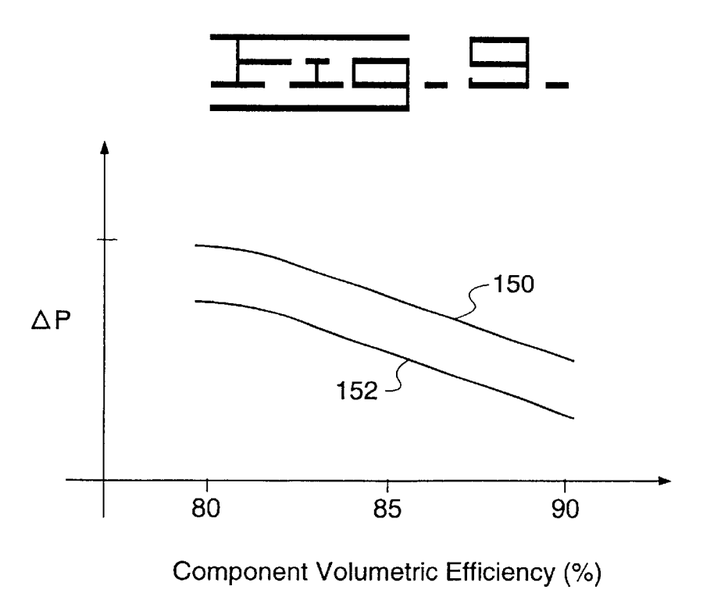
FIG. 9 is a graph of component volumetric efficiency versus pressure differential.

Referring now to FIG. 9, there is shown a plot of volumetric efficiency versus pressure differential for a hydraulic device. The line 150 represents a maximum volumetric efficiency for either the pump 48 or the motor 52. The line 152 represents an adjusted volumetric efficiency. The volumetric efficiency of the line 152 is adjusted downwardly for factors such as temperature, hydraulic speed, displacement, and wear. The first pressure signal from the pressure sensor 90 is compared to the second pressure signal from the pressure sensor 92 to determine the pressure differential. The pressure differential between the line 54 and the line 56 can be determined from first pressure signal and the second pressure signal. Using the individual pressures and the pressure differential, it is possible to determine if the pump 48 is driving the motor 52 or if the motor 52 is driving the pump 48, and it is possible to estimate the volumetric efficiencies as shown in FIG. 9. Volumetric efficiencies of the pump 48 and the motor 52 can be estimated from this pressure differential. For example, FIG. 9 shows us that high pressure differentials indicate that the hydraulic components are operating at relatively low volumetric efficiencies whereas low pressure differentials indicate that the hydraulic components are operating at higher volumetric efficiencies. It should be appreciated that the efficiencies will be adjusted downwardly for factors such as temperature, hydraulic speed, displacement, and wear.

Alternately, a single pressure sensor may be used to measure the resolved pressure within the hydraulic transmission 16. The resolved pressure is the highest pressure in either the conduit 54 or the conduit 56. The lowest pressure in the conduit 54 or the conduit 56 will be the supply pressure supplied by the pilot pump 42. Therefore, the pressure differential can be determined from the resolved pressure alone. The drawback to using a single pressure sensor measuring the resolved pressure alone is that it is not possible to determine if the pump 48 is driving the motor 52 or if the motor 52 is driving the pump 48. Thus, it is impossible to tell whether the hydraulic transmission 16 is operating under a positive load or negative load. However, a single resolved pressure combined with the transmission input speed signal from the speed sensor 76, which is proportional to the speed of the engine 12, can be used to determine if there is a positive or negative load on the engine 12. If the transmission input signal indicates an engine speed less than high idle value, then the engine 12 is experiencing a positive load. Alternately, if the transmission input signal indicates an engine speed greater than the high idle value, then the engine 12 is experiencing a negative load on the engine 12. Knowing whether the engine 12 is experiencing positive or negative load, and knowing the engagement state of the clutches 36, 38, and 40 it is possible to determine if the pump 48 is driving the motor 52 or if the motor 52 is driving the pump 48.

Figure 10:
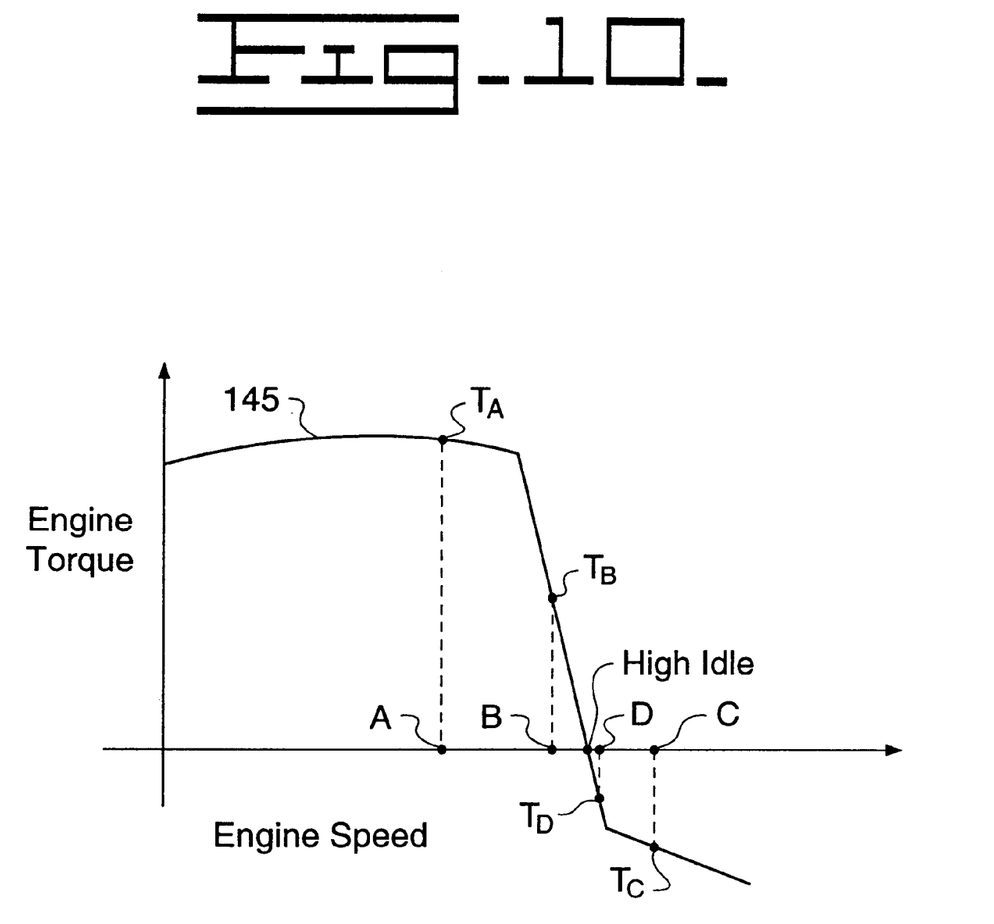
FIG. 10 is graph of engine torque versus engine speed.

Referring now to FIG. 10, there is shown a graph of engine torque versus engine speed for an exemplary engine 12. The engine speed is used to estimate the load. The point A is an engine speed corresponding to a peak power point $T_A$. The point B is an engine speed corresponding to a torque $T_B$ which has approximately 25% (±10%) of the torque of the point TA. The point C is an engine speed corresponding to the torque level $T_C$ where there is no fuel being supplied to the engine 12. And the point D is an engine speed corresponding to a torque point $T_D$ having 25% (±25%)of the torque of the point $T_C$.

Figure 11:
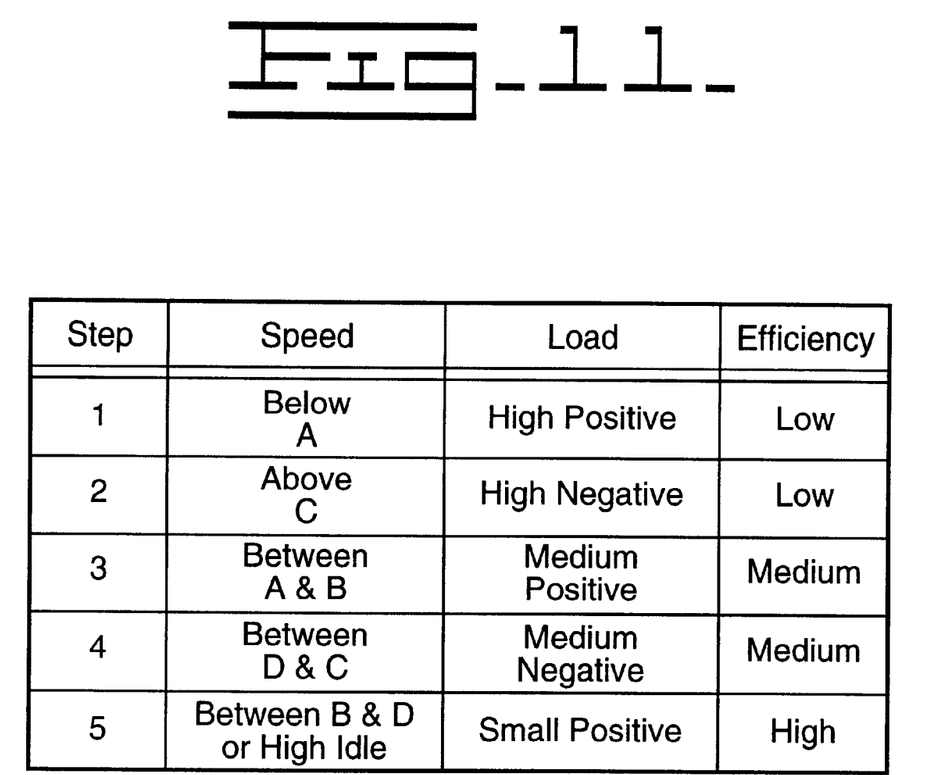
FIG. 11 is a table used to estimate component volumetric efficiency in the absence of pressure data.

Referring now to FIG. 11, there is shown a table which can be used to estimate component volumetric efficiencies without a pressure reading. The controller 18 determines an engine speed based on the transmission input speed signal from the sensor 76. As a fist step, the controller 18 determines if the sensed engine speed is less than a stored engine speed value A, of FIG. 10 indicative of high engine load. If so, this indicates that the engine 12 is operating at a high positive load and the component volumetric efficiencies are relatively low, such as 80% shown in FIG. 9. As a second step, the controller 18 determines if the sensed engine speed is greater than the engine speed C of FIG. 9 where no fuel is being supplied to the engine 12. If so, this indicates that the engine 12 is operating at a high negative load and the component volumetric efficiencies are relatively low, such as 80% shown in FIG. 9. As a third step, the controller 18 determines if the sensed engine speed is less than a point B, but greater than the point A, of FIG. 10 which indicates that the engine 12 is operating at an intermediate positive load and the component volumetric efficiencies are in an intermediate range, such as 85% shown in FIG. 9. As a fourth step, the controller 18 determines if the sensed engine speed is above the point D, but below point C, of FIG. 10. If so, this indicates that the engine 12 is operating at an intermediate negative load and the component volumetric efficiencies are in an intermediate range, such as 85% shown in FIG. 9. As a final step, the controller 18 determines if the sensed engine speed is between the points B and D (near high idle). If so, this indicates that the engine 12 is operating at a small positive load and the component volumetric efficiencies are high, such as 90% shown in FIG. 9.

Knowing whether the pump 48 is driving the motor 52 or the motor 52 is driving the pump 48 combined with the estimated volumetric efficiencies, the equal displacement travel speed ratio can be calculated. For a shift from the first range 101 to the second range 102, when it is determined that the pump 48 is driving the motor 52, the volumetric efficiencies are used to calculate the equal displacement travel speed ratio 104 of FIG. 4. For a shift from the first range 101 to the second range 102, when it is determined that the motor 52 is driving the pump 48, the volumetric efficiencies are used to calculate the equal displacement travel speed ratio 106 of FIG. 5. For a shift from the second range 102 to the first range 101, when it is determined that the motor 52 is driving the pump 48, the volumetric efficiencies are used to calculate the equal displacement travel speed ratio 108 of FIG. 6. For a shift from the second range 102 to the first range 101, when it is determined that the pump 48 is driving the motor 52, the volumetric efficiencies are used to calculate the equal displacement travel speed ratio 110 of FIG. 7.

INDUSTRIAL APPLICABILITY

In operation, the controller 18 determines which of the four operating conditions the transmission 10 is operating under as the transmission 10 approaches the shift point. The four operating conditions are (i) accelerating toward the shift point while operating under a positive load, shown in FIG. 4, (ii) accelerating toward the shift point while operating under a negative load, shown in FIG. 5 (iii) decelerating toward the shift point while operating under a positive load, shown in FIG. 6, and (iv) decelerating toward the shift point while operating under a negative load, shown in FIG. 7.

The controller 18 then determines volumetric efficiencies the components of the hydrostatic transmission 16 using (i) the pressure difference between the first pressure sensor 90 and the second pressure sensor 92 combined with the volumetric efficiency data of FIG. 9, (ii) a single pressure from the sensor 90 or 92, engine speed, and efficiency data of FIG. 9, or (iii) the engine speed and the stored data shown in FIG. 10.

Using the calculated volumetric efficiencies, if the work machine is accelerating toward the shift point while operating under a positive load, the controller 18. initiates a shift at the equal displacement travel speed ratio 104 of FIG. 4. If the work machine is accelerating toward the shift point while operating under a negative load, the controller 18 initiates a shift at the equal displacement travel speed ratio 106 of FIG. 5. If the work machine is decelerating toward the shift point while operating under a positive load, the controller 18 initiates a shift at the equal displacement travel speed ratio 108 of FIG. 6. If the work machine is decelerating toward the shift point while operating under a negative load, the controller 18 initiates a shift at the equal displacement travel speed ratio 110 of FIG. 7.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A transmission assembly comprising:

a hydrostatic transmission having a variable displacement hydraulic device which controls a ratio of an input speed to an output speed of the hydrostatic transmission;

a torque reversing mechanical transmission coupled to the hydrostatic transmission and having a first range and a second range;

an output shaft driven by one or more of the hydrostatic transmission and the mechanical transmission which causes a work machine to move at a travel speed; and a controller operable to determine a transmission load and an equal displacement travel speed ratio based on the transmission load, wherein a shift from the first gear range to the second gear range is based on the equal displacement travel speed ratio.

2. The apparatus of claim 1, wherein:

the load varies with the volumetric efficiencies of the hydraulic components.

3. The apparatus of claim 2, wherein the volumetric efficiencies of the hydraulic components are a function of pressure differential within the hydrostatic transmission.

4. The apparatus of claim 3, further comprising a pressure sensor which measures a resolved pressure, wherein the pressure differential in the hydrostatic transmission is calculated from the resolved pressure.

5. The apparatus of claim 3, further comprising a first pressure sensor which measures a first pressure and a second pressure sensor which measures a second pressure in the hydrostatic transmission, wherein the pressure differential is determined from the first pressure and the second pressure.

6. The apparatus of claim 3, further comprising a speed sensor to measure the input speed, wherein the pressure differential is determined from the input speed.

7. A transmission assembly comprising:
a hydrostatic transmission having a variable displacement hydraulic device which controls a ratio of an input speed to an output speed of the hydrostatic transmission;
a torque reversing mechanic al transmission coupled to the hydrostatic transmission and having a first range and a second range;
an output shaft driven by one or more of the hydrostatic transmission and the mechanical transmission which causes a work machine to move at a travel speed; and
a controller operable to determine a transmission load,
wherein a shift from the first gear range to the second gear range is initiated at a displacement based on the transmission load which reduces the change in travel speed caused by the shift from the first gear range to the second gear range.

8. The apparatus of claim 7, wherein: the load varies with the volumetric efficiencies of the components of the hydrostatic transmission.

9. The apparatus of claim 8, wherein the volumetric efficiencies of the hydraulic components are a function of pressure differential within the hydrostatic transmission.

10. The apparatus of claim 9, further comprising a pressure sensor which measures a resolved pressure, wherein the pressure differential in the hydrostatic transmission is calculated from the resolved pressure.

11. The apparatus of claim 9, further comprising a first pressure sensor which measures a first pressure and a second pressure sensor which measures a second pressure in the hydrostatic transmission, wherein the pressure differential is determined from the first pressure and the second pressure.

12. The apparatus of claim 9, further comprising a speed sensor to measure the input speed, wherein the pressure differential is determined from the input speed.

13. The apparatus of claim 9, wherein the displacement based on the load which reduces the change in travel speed ratio caused by the shift from the first gear range to the second gear range occurs at the equal displacement travel speed ratio.

14. A method of operating a transmission assembly having (i) a hydrostatic transmission with a variable displacement hydraulic device which controls a ratio of an input speed to an output speed of the hydrostatic transmission, (ii) a torque reversing mechanical transmission coupled to the hydrostatic transmission and having a first range and a second range, (iii) an output shaft driven by one or more of the hydrostatic transmission and the mechanical transmission at a travel speed, and (iv) a controller, the method comprising the steps of:
determining a transmission load;
determining an equal displacement travel speed ratio where the displacement of the variable displacement device in the second gear range is the same as the displacement of the variable displacement device in the first gear range for the determined transmission load; and
initiating a shift from the first range to the second range at a based on the equal displacement travel speed ratio.

15. The method of claim 14, the determining the equal displacement travel speed ratio step further comprising the step of calculating volumetric efficiencies of components of the hydrostatic transmission.

16. The method of claim 15, further comprising the step calculating the volumetric efficiencies from a pressure differential within the hydrostatic transmission.

17. A method of operating a transmission assembly having (i) a hydrostatic transmission with a variable displacement hydraulic device which controls a ratio of an input speed to an output speed of the hydrostatic transmission, (ii) a torque reversing mechanical transmission coupled to the hydrostatic transmission and having a first range and a second range, (iii) an output shaft driven by one or more of the hydrostatic transmission and the mechanical transmission at a travel speed, and (iv) a controller, the method comprising the steps of:
determining a transmission load;
determining a displacement of the variable displacement hydraulic device which reduces the change in travel speed ratio caused by the shift from the first gear range to the second gear range for the determined transmission load; and
initiating a shift from the first range to the second range at a based on the determined displacement.

18. The method of claim 17, the determining the displacement step further comprising the step of calculating volumetric efficiencies of components of the hydrostatic transmission.

19. The method of claim 18, further comprising the step of calculating the volumetric efficiencies from a pressure differential within the hydrostatic transmission.

20. The method of claim 17, the determining the displacement step further comprising the step of calculating an equal displacement travel speed ratio.

* * * * *